United States Patent [19]

Sawamoto et al.

[11] Patent Number: 4,892,402

[45] Date of Patent: Jan. 9, 1990

[54] METHOD FOR MAKING CONTACT LENS HYDROPHILIC

[75] Inventors: Takeyuki Sawamoto, Tokyo; Koichi Ishida; Niro Tarumi, both of Akishima; Tetsuro Izumitani, Hino, all of Japan

[73] Assignee: Hoya Corporation, Tokyo, Japan

[21] Appl. No.: 187,472

[22] Filed: Apr. 28, 1988

[30] Foreign Application Priority Data

Apr. 30, 1987 [JP] Japan .................................. 62-107563

[51] Int. Cl.$^4$ .............................................. B05D 3/06
[52] U.S. Cl. ............................... 351/160 H; 427/54.1; 427/112; 427/164
[58] Field of Search ...................... 427/162, 164, 54.1; 264/1.4, 1.7; 351/160 H

[56] References Cited

U.S. PATENT DOCUMENTS

| | | | |
|---|---|---|---|
| 4,073,577 | 2/1978 | Höfer | 264/1.4 |
| 4,199,421 | 4/1980 | Kamada et al. | 264/1.4 |
| 4,544,572 | 10/1985 | Sardvig et al. | 427/164 |
| 4,758,448 | 7/1988 | Sandvig et al. | 427/54.1 |
| 4,774,035 | 9/1988 | Carmelite et al. | 427/54.1 |

FOREIGN PATENT DOCUMENTS 60-24701 12/1985 Japan .................................. 427/164

*Primary Examiner*—Stanley Silverman
*Attorney, Agent, or Firm*—Nixon & Vanderhye

[57] ABSTRACT

A contact lens is made hydrophilic by contacting the lens with a treating solution containing a hydrophilic monomer, at least one photosensitizer selected from aromatic ketones or quinones, and a sovlent, and thereafter irradiating the contact lens with ultraviolet light.

6 Claims, No Drawings

METHOD FOR MAKING CONTACT LENS HYDROPHILIC

BACKGROUND OF THE INVENTION
1. Field of the Invention

The present invention relates to a method for making contact lens hydrophilic. More particularly the invention relates to a method for imparting good wettability by water to hard contact lens which is normally poor in surface wettability by water.

2. Description of Prior Art

In the conventional hard contact lenses, the materials comprising polymethyl methacrylate as main component have been used because of their excellent optical properties, high physical strength and good machinability. Recently, importance has been recognized on the supply of oxygen through contact lens for the metabolism of cornea, and the polymers containing silicon or fluorine have come to be used popularly as lens material because of their excellent oxygen permeability. Typical examples of such silicon-containing polymers are silicon rubber and the polymers of acrylates or methacrylates having siloxane bond in the side chain.

The polymers of acrylates or methacrylates having a perfluoroalkyl group in the side chain can be cited as typical examples of fluorine-containing polymers.

These materials, although having excellent oxygen permeability, are poor in surface hydrophilicity, and many of them show a strong water repellancy. The contact lens with poor surface hydrophilicity, i.e., poor wettability with tear liquid has the problem that it could make improper correction of eyesight. It also has the problem of unfitness or giving a sense of disagreeableness to the wearer because of unsmooth movement of the lens on the horny coat of the eye.

Various proposals have been made for providing good surface hydrophilicity to such lens materials. For instance, Japanese Patent Publication No. 56-39450 and Japanese Patent Application Laid-Open (Kokai) No. 58-7418 and 59-19918 disclose the methods for improving hydrophilicity of lens materials by means of copolymerization with hydrophilic monomers.

Also, Japanese Patent Publication No. 57-35443 and Japanese Patent Application Laid-Open (Kokai) No. 58-17412 disclose the methods for forming lens materials by using a polymerization component having a functional group that can be after-treated for imparting hydrophilicity to the contact lens surface by an after-treatment.

Further, Japanese Patent Publication No. 55-49288 and Japanese Patent Application Laid-Open (Kokai) No. 58-216222 disclose the methods for making hydrophilic the surface of contact lens made of a silicone resin by plasma treatment or plasma polymerization.

Said methods comprising copolymerization with hydrophilic monomers, however, have the defect that because of the contradictory tendency of the proportion of hydrophilic monomer in composition and the oxygen permeability of contact lens, an attempt to impart sufficient hydrophilicity to the lens surface may cause excessive lowering of oxygen permeability while an attempt to maintain high oxygen permeability may result in poor hydrophilicity of the lens surface. Generally, the silicon- or fluorine-containing monomers used as oxygen permeability imparting component have the problem that when they are copolymerized with hydrophilic monomes, the resulting polymers tend to become cloudy because of strong hydrophobicity.

Also, in the case of the methods in which contact lens is formed by using a compound having a specific functional group as polymerization component for the purpose of making the lens surface hydrophilic by an after-treatment, there are the problems that the materials which can be made hydrophilic are limited to a specific type and that oxygen permeability of the material is lowered as in the case of copolymerization with hydrophilic monomers.

The method for making the contact lens surface hydrophilic by plasma treatment is impractical since the effect of making the lens surface hydrophilic tends to die away in a short time and also such effect may be lost by various causes such as drying of the lens which may take place in ordinary use of the lens. Recently, grafting of hydrophilic monomers to the contact lens surface by plasma polymerization is tried, but this technique is defective in durability of water wettability and also tends to give rise to the same problems as in the case of said plasma treatment. Further, setting of the treating conditions is very complex and delicate in the methods comprising said plasma treatment or plasma polymerization. The effect of treatment is greatly affected not only by such fundamental parameters as power for plasma treatment, treating time, degree of vacuum, etc., but also by such factors as configuration of the apparatus and retained state or position of the lens. Thus, the lenses treated according to these methods are poor in durability and repeatability.

Still further, the apparatus used for said plasma treatment or plasma polymerization necessitates specific equipments such as vacuum system and high-frequency power source. This coupled with said complex setting of treating conditions makes the operations complicate and troublesome to carry out.

Accordingly, an object of this invention is to provide a method for making the contact lens surface hydrophilic, by which the contact lens is provided with the ability to effect proper correction of eyesight and good fitness to the eye without being impaired in its inherent properties such as oxygen permeability, optical characteristics and mechanical strength.

Another object of the present invention is to provide said method for making the contact lens surface hydrophilic, which method is easy to practice, can realize long-time retention of effect of the treatment and can provide the lens with good durability and repeatability.

Other objects and advantages of the present invention will be apparent from the following description of the invention.

SUMMARY OF THE INVENTION

As a result of assiduous studies for attaining said objects, the present inventors found out a method by which the contact lens surface can be made hydrophilic effectively while excluding said problems of the prior art, and the present invenrtion was achieved based on such finding.

The method for making contact lens hydrophilic according to the present invention comprises contacting a contact lens with a treating solution containing a hydrophilic monomer, at least one photosensitizer selected from aromatic ketones or quinones, and a solvent, and thereafter irradiating said contact lens with ultraviolet light.

The present invention will hereinafter be described in detail.

The hydrophilic monomers usable in this invention include hydrophilic vinyl monomers such as acrylic acid, methacrylic acid, hydroxyethyl acrylate, hydroxyethyl methacrylate, acrylamide, methacrylamide, N,N-dimethylacrylamide, N-vinylpyrrolidone and the like. It is also possible to use other hydrophilic vinyl monomers such as dimethylaminomethyl acrylate, dimethylaminoethyl acrylate, dimethylaminomethyl methacrylate, dimethylaminoethyl methacrylate, hydroxypropyl acrylate, hydroxypropyl methacrylate, glycerol acrylate, glycerol methacrylate, diethylene glycol monoacrylate, diethylene glycol monomethacrylate, triethylene glycol monoacrylate, triethylene glycol monomethacrylate and the like.

The photosensitizer used in this invention is at least one compound selected from aromatic ketones or quinones, the typical examples thereof being xanthone, thioxanthone, benzophenone, benzoin, benzyl, benzoyl peroxide, anthraquinone, phenanthraquinone, naphtoquinone and their derivatives.

Examples of such derivatives include 2-chloroxanthone, 2,4-diethylxanthone, 2,4-diisopropylxanthone, 2-isopropylxanthone, 2-chlorothioxanthone, 2,4-dimethylthioxanthone, 2,4-diethylthioxanthone, 2-isopropylthioxanthone, 2,4-diisopropylthioxanthone, benzoinisopropyl ether, benzoinisobutyl ether, benzoinethyl ether, 2-chlorobenzophenone, m-toluoyl peroxide, 2-chloroanthraquine, 2-methylanthraquinone, 2-hydroxyanthraquine, 1-methylanthraquinone, 1-bromoanthraquinone, 1-methylphenanthraquinone, 4-ethylphenanthraquinone, 2,7-di-tert-butylphenanthraquinone, and the like.

The solvents usable in this invention include alcohols such as methanol, ethanol, n-propanol, iso-propanol, n-butanol, 2-butanol, n-hexanol, cyclohexanol and benzyl alcohol; aliphatic or alicyclic hydrocarbons such as n-hexane, n-heptane, n-octane, n-noane and cyclohexane; and ketones such as acetone.

The contact lens materials that can be subjected to the treatment for making them hydrophilic in the present invention include homopolymers or copolymers containing as their component at least one monomer selected from alkyl (meth)acrylate, aralkyl (meth)acrylate, cycloalkyl (meth)acrylate, alkylcycloalkyl (meth)acrylate, fluoro (meth)acrylate, and silicon-containing (meth)acrylates. Concrete examples of said monomers are methyl (meth)acrylate, ethyl (meth)acrylate, propyl (meth)acrylate, iso-propyl (meth)acrylate, n-butyl (meth)acrylate, 2-butyl (meth)acrylate, tert-butyl (meth)acrylate, cyclohexyl (meth)acrylate, benzyl (meth)acrylate, 4-tert-butyl-cyclohexyl (meth)acrylate, lauryl (meth)acrylate, n-hexyl (meth)acrylate, trifluoroethyl (meth)acrylate, hexafluoroisopropyl (meth)acrylate, pentafluoropropyl (meth)acrylate, heptafluoropentyl (meth)acrylate, nonafluorohexyl (meth)acrylate, perfluorobenzyl (meth)acrylate, trimethylsilylmethyl (meth)acrylate, pentamethyldisiloxyethyl (meth)acrylate, tris(trimethylsiloxy)silylpropyl (meth)acrylate, methyldi (trimethylsiloxy)silylpropyl (meth)acrylate, tetrakis (trimethylsiloxy)methyldisiloxanylpropyl(meth)acrylate, tert-butyltetramethyldisiloxanylethyl (meth)acrylate, and the like. In production of contact lens materials by polymerization of said monomers, it is possible to use with said monomer(s) a crosslinking agent such as ethylene glycol di(meth)acrylate, diethylene glycol di(meth)acrylate, triethylene glycol di(meth)acrylate, tetraethylene glycol di(meth)acrylate, polyethylene glycol di(meth)acrylate, divinylbenzene, allyl methacrylate, vinyl (meth)acrylate, trimethylolpropane tri(meth)acrylate, triallyl isocyanurate and the like. In the above exemplification of monomers and crosslinking agents, "(meth)acrylate" means both acrylate and methacrylate.

Now, the method of this invention will be described in particular.

The method of this invention comprises contacting a contact lens with a treating solution prepared by dissolving proper amounts of a hydrophilic monomer and a photosensitizer such as mentioned above in a solvent such as mentioned above and well stirring the solution, and then irradiating said contact lens with ultraviolet light.

The hydrophilic monomer concentration in the treating solution is preferably in the range of 0.1 to 10 mol/l, more preferably 0.5 to 5 mol/l. The photosensitizer concentration is preferably in the range of $1 \times 10^{-4}$ to 1 mol/l, more preferably $1 \times 10^{-3}$ to 1 mol/l. If the monomer and photosensitizer concentrations are below said ranges, no satisfactory effect of the treatment will be provided.

When stirring the treating solution, it is desirable for elevating the effect of the treatment to introduce an inert gas such as nitrogen gas or helium gas into the treating solution to make away with oxygen dissolved in the solution.

Various methods are available for contacting the contact lens with the treating solution. For instance, such contact can be effected by immersing the contact lens in the treating solution, or by dropping the treating solution onto the surface of the contact lens, or by retaining the contact lens in a glass-made holder having a proper radius of curvature and filled with the treating solution.

Then the contact lens is irradiated with ultraviolet light. As the ultraviolet light source, there can be used any of those light sources which are ordinarily used for ultraviolet light polymerization, such as low pressure mercury lamp, high pressure mercury lamp, metal halide mercury lamp, etc. The contact lens may be irradiated from its front curve side or base curve side, or from both sides simultaneously. As for the wavelength of ultraviolet light to be applied, it is possible in this invention to apply the whole wavelength of ultraviolet light source or to selectively apply ultraviolet light in a specified range of wavelength by using an optical filter or Pyrex glass, but in either case it is imperative to apply ultraviolet light of the wavelength corresponding to the photosensitizer absorbing wavelength. The intensity of ultraviolet light irradiation is preferably in the range of 0.1 to 100 milliwatts/cm$^2$, more preferably 1 to 20 milliwatts/cm$^2$, in the effective wavelength region. When the intensity of irradiation is less than 0.1 milliwatts/cm$^2$, there arise the problems such as too long treating time, while an irradiation intensity higher than 100 milliwatts/cm$^2$ tends to adversely affect the effect of the treatment due to depolymerization reaction and may also cause other problems such as deterioration and coloration of the contact lens.

The ultraviolet light irradiation time is usually set in the range of 10 seconds to 120 minutes, but in view of workability and prevention of deterioration of the treated lens, it is desirable that the treatment be finished within 10 minutes. When the treating time exceeds said range, there not only results an excessive reduction of workability but there also take place other problems such as a reduced effect of the treatment due to volatilization of the treating solution and rise of temperature of the contact lens due to infrared rays released from the ultraviolet light source, causing softening or deformation of the lens or its coloration due to ultraviolet degradation. When the treating time is short of said range, the desired effect of the treatment can not be obtained.

When irradiating the contact lens with ultraviolet light, it is expedient for elevating the effect of the treatment to place the lens and the treating solution under an atmosphere of an inert gas such as nitrogen gas or helium gas.

The intensity of ultraviolet light irradiation and the irradiation time are closely related with each other; when the irradiation intensity is high, the irradiation time may be short, while when the irradiation intensity is low, the irradiation time must be prolonged accordingly for obtaining the same effect of the treatment. Therefore, the ultraviolet light irradiation conditions must be set by taking into consideration the balance of said both factors.

The ultraviolet-light irradiated lens needs to be cleaned for removing the unnecessary polymer on the surface. Washing with purified water or an alcohol is available for such purpose. In order to hike the cleaning effect, the lens may be kept immersed in hot water for several minutes.

The surface of the contact lens thus obtained has an excellent wettability by water, with a hydrophilicity contact angle of 20°–40°. When the contact lens obtained according to this invention is immersed in water and again taken out into the open air, the water wetting the lens surface is not repelled away but kept staying on the lens surface.

The method for making contact lens hydrophilic according to this invention is capable of treating a large number of contact lenses at the same time.

The present invention will hereinafter be described in further detail with reference to the examples thereof.

EXAMPLE 1

A mixed solution comprising 60 parts by weight of hexafluoroisopropyl methacrylate, 40 parts by weight of tris(trimethylsiloxy)silylpropyl methacrylate and 6 parts by weight of ethylene glycol dimethacrylate was prepared. This solution was added with 0.1 part by weight of azobisisobutyronitrile as polymerization initiator and stirred to prepare a homogeneous polymerization solution. This polymerization solution was put into a 2 ml polypropylenemade polymerizer and the top opening thereof was sealed. The polymerization was carried out at 40° C. for 12 hours, at 50° C. for 6 hours, at 60° C. for 4 hours, at 80° C. for 4 hours and at 120° C. for 3 hours by using a hot air circulation type thermostat. A hard contact lens was made from the polymerizate by ordinary machining.

Separately 1.42 g of acrylamine (used as hydrophilic monomer) and 0.39 g of benzophenone (used as photosensitizer) were dissolved in 10 ml of methanol and stirred uniformly, and then nitrogen gas was introduced into the solution to prepare a treating solution for making the lens hydrophilic.

This treating solution was put into a Petri dish and said contact lens was immersed therein. Then the top of said Petri dish was covered with Pyrex glass, followed by ultraviolet-light irradiation in a nitrogen atmosphere. A 300 W high-pressure mercury lamp was used as ultraviolet light source. The intensity of irradiation was 5 mW/cm$^2$ for the light rays of 350 nm and the irradiation time was 5 minutes.

After ultraviolet-light irradiation, the lens was immersed in an aqueous salt solution of 60° C. for 2 hours for cleaning the lens, thus obtaining a hard contact lens which has undergone the treatment for making the lens hydrophilic according to this invention. This lens showed good hydrophilicity on the surface, and when it was immersed in water and then taken out into the air, it did not repel water but held it on the surface. Even when this lens was subjected to the repeated drying-wetting operations (the lens being left in the air for drying it and then again immersed in water, the same operations being conducted repeatedly), the lends did not lose its water wettability on the surface. Also, when this contact lens was actually applied to the eye, it gave little sense of incompatibility to the wearer and could move smoothly on the cornea.

A plate-like sample was cut out from the polymerizate obtained in the same way as the contact lens of this example, and its oxygen permeability and hydrophilicity contact angle before and after the surface treatment were measured, the results being shown in Table 1. As seen from Table 1, it is possible according to the method of this invention to effectively improve the surface wettability of lens by water while maintaining the oxygen permeability of the lens material.

EXAMPLE 2

A hard contact lens made of the same material as that of Example 1 was subjected to the following treatment for making the lens surface hydrophilic.

0.72 g of acrylic acid (hydrophilic monomer) and 0.24 g of 2-chlorothioxanthone (photosensitizer) were dissolved in 10 ml of n-propanol, and this solution was stirred while passing nitrogen gas therethrough to prepare a treating solution. This treating solution was dropped into a glassmade holder having a radius of curvature approximate to that of contact lens, and said hard contact lens was held thereon. The treating solution was also dropped to the opposite side of the lens so that both sides of the lens were wetted with the treating solution. Then the whole holder with the contact lens held thereon was placed in a nitrogen stream and irradiated with ultraviolet light screened by a filter to cut out the light rays of wavelength smaller than 300 nm. The intensity of ultraviolet-light irradiation was 20 mW/cm$^2$ (350 nm) and the irradiation time was 10 minutes. After ultraviolet-light irradiation, the lens was cleaned by the same method as used in Example 1.

The surface of the thus obtained contact lens had excellent wettability by water as the contact lens of Example 1. Also, a plate-like sample obtained in the same way as the contact lens of this example had a hydrophilicity contact angle of 32° as shown in Table 1.

Further, even when this contact lens was kept immersed in hot water of 80° C. for 2 weeks, no drop of water wettability on the surface was observed, indicating splendid durability of the effect of the treatment.

EXAMPLE 3–13

The hard contact lenses made of various materials were subjected to the treatment for making the lens surface hydrophilic according to Examples 1 and 2. The conditions for the treatment and the oxygen permeability constant and hydrophilicity contact angle of each lens before and after the treatment are shown in Table 1.

All of the contact lenses which have been made hydrophilic in these examples showed good wettability by using a Seikaken-type film oxygen permeability meter. The unit is $\times 10^{-10}$ cc(STP).cm/cm$^2$.sec.cmHg.

TABLE 1

| Ex. ample | Composition of contact lens material (parts by weight) | Hydrophilic monomer (mol/l) | Photosensitizer (mol/l) | Solvent | Intensity of ultraviolet-light irradiation (mw/cm$^2$) | Irradiation time (min) | Hydrophilicity contact angle of non-treated lens (°) | Hydrophilicity contact angle after surface treatment (°) | Oxygen permeability of non-treated lens | Oxygen permeability after surface treatment |
|---|---|---|---|---|---|---|---|---|---|---|
| 1 | PEMA/SiMA/1G (60/40/6) | AAm (2) | BP (0.2) | Methanol | 5 | 5 | 82 | 28 | 70 | 69 |
| 2 | PEMA/SiMA/1G (60/40/6) | AA (1) | CTX (0.1) | n-propanol | 20 | 10 | " | 32 | " | 70 |
| 3 | PEMA/SiMA/1G (60/40/6) | AAm (0.2) | BP (0.4) | Methanol | 15 | 1 | " | 25 | " | 68 |
| 4 | PEMA/SiMA/1G (60/40/6) | AAm (3) | BP (0.001) | " | 5 | 20 | " | 26 | " | 69 |
| 5 | SiMA/TFEMA/3G (60/40/10) | AAm (3) | BP (0.2) | Ethanol | " | 7 | 85 | 25 | 52 | 52 |
| 6 | SiMA/TFEMA/3G (60/40/10) | MAA (2) | BZ (0.2) | iso-propanol | " | 5 | " | 35 | " | 50 |
| 7 | SiMA/TFEMA/3G (60/40/10) | DMAA (2) | BIPE (0.2) | Methanol | 20 | 8 | " | 39 | " | 51 |
| 8 | SiMA/TBCHMA/EMA/1G(60/30/10/10) | AAm (2) | BP (0.2) | Acetone | 5 | 5 | 90 | 25 | 40 | 40 |
| 9 | SiMA/TBCHMA/EMA/1G(60/30/10/10) | NVP (1) | AQ (0.2) | Benzyl alcohol | 10 | 7 | " | 33 | " | 39 |
| 10 | SiMA/TBCHMA/EMA/1G(60/30/10/10) | AAm (0.5) | BP (0.2) | Acetone | 5 | 40 | " | 28 | " | 38 |
| 11 | SiMA/TBCHMA/EMA/1G(60/30/10/10) | AAm (2) | BPO (0.01) | " | " | 5 | " | 32 | " | 39 |
| 12 | MMa/CHMA/1G (95/5/3) | HEA (2) | BP (0.4) | n-propanol | 10 | 10 | 68 | 25 | 0.1 | 0.1 |
| 13 | MMa/CHMA/1G/1G(60/30/10/10) | AA (4) | BZ (0.6) | n-octane | 50 | 3 | " | 22 | " | " |

The abbreviations used in Table 1 are as follows:
PFMA: hexafluoroisopropyl methacrylate
SiMA: tris(trimethylsiloxy)silylpropyl methacrylate
1G: ethylene glycol dimethacrylate
TFEMA: trifluoroethyl methacrylate
3G: triethylene glycol dimethacrylate
TBCHMA: 4-tert-butyl-cyclohexyl methacrylate
MMA: methyl methacrylate
CHMA: cyclohexyl methacrylate
EMA: ethyl methacrylate
AAm: acrylamide
AA: acrylic acid
MAA: methacrylic acid
DMAA: N,N—dimethylacrylamide
NVP: N—vinylpyrrolidone
HEA: hydroxyethyl acrylate
BP: benzophenone
CTX: 2-chlorothioxanthone
BZ: benzyl
BIPE: benzoinisopropyl ether
AQ: anthraquinone
BPO: benzoyl peroxide water, and even when subjected to the repeated drying-wetting cycles or immersed in hot water for a long time or cleaned with the ordinarily used cleaners as in Examples 1 and 2, said contact lenses did not lose the effect of the treatment and maintained enough water wattability to serve for practical use.

The intensity of ultraviolet-light irradiation shown in Table 1 indicates the itensity of the ultraviolet light applied to the contact lens as measured at the wavelength of 350 nm by using an ultraviolet illuminometer manufactured by ORC KK. The hydrophilicity contact angle indicates the contact angle measured by the air bubble method on the plate-like samples prepared from the same materials as subjected to the surface treatment, by using a goniometer type contact angle meter manufactured by Erma Optical Works Co., Ltd. The oxygen permeability shown in Table 1 is the oxygen permeability coefficient of the 0.2 mm thick platelike samples as measured in a 35° C. physiological saline solution by

COMPARATIVE EXAMPLE 1

To the monomer composition for contact lens material of Example 1 was further added 10 parts by weight of acrylamide, and the mixture was polymerized in the same way as Example 1 to obtain a copolymer. The hydrophilicity contact angle of this material was 80° and the effect of improving water wettability was very small. Also, the oxygen permeability constant of this material deteriorated to $55 \times 10^{-10}$cc(STP).cm/cm$^2$.sec.cmHg.

COMPARATIVE EXAMPLE 2

The monomer composition for contact lens material of Example 8 was further added with 50 parts by weight of methacrylic acid and polymerized to obtain a copolymer. The hydrophilicity contact angle of this material was 70°, indicating a slight improvement of hydrophilicity, but the oxygen permeability constant as low as $16 \times 10^{-10}$ cc(STEP).cm/cm$^2$.sec.smHg.

COMPARATIVE EXAMPLE 3

A hard contact lens obtained from the material of Example 1 was subjected to a plasma treatment in a dilute ammonia gas. The contact lens surface showed good water wettability immediately after the treatment, but after the lapse of two weeks the lens surface again became water-repellent and the effect of the treatment has disappeared.

COMPARATIVE EXAMPLE 4

A hard contact lens which had been subjected to the plasma treatment as in Comparative Example 3 was contacted with a methanol solution containing 2.0 mol/l of acrylamide and 0.2 mol/l of azobisisobutyronitrile and thermopolymerized at 60° C. for 4 hours. The surface of the thus obtained contact lens initially showed good wettability by water, but when cleaned with an ordinary contact lens cleaner, the lens was deprived of its hydrophilic nature on the surface each time it was cleaned. Thus, this lens was very poor in durability of hydrophilic nature.

COMPARATIVE EXAMPLE 5

The procedure of Example 5 was followed except that azobisisobutyronitrile was used as photosensitizer. When the obtained contact lens was immersed in hot water of 60° C. for 2 hours, no improvement of hydrophilicity on the lens surface was noted.

As apparent from the Examples and Comparative Examples described above, according to the method for making contact lens hydrophilic of this invention, it is possible to provide a lens surface with very excellent hydrophilic nature without adding any specific component to the lens material. It can significantly improve the adaptability and eyesight correcting ability of contact lens to provide more excellent contact lenses than those available hitherto.

Also, the method for imparting hydrophilicity to contact lens according to this invention has an advantageous feather that it can invest a contact lens with two contradictory properties, i.e. oxygen permeability and hydrophilicity at the same time, which has been quite difficult in the prior art.

Further, the excellent water wettability provided according to the method of this invention will not be dilapidated even when the lens is subjected to a repetition of driving and wetting which would be experienced in ordinary use of contact lens, or when it is washed or cleaned with a cleaner or immersed in hot water. Thus, the lens can maintain the effect of the treatment for a long time.

Moreover, the method of this invention is featured not only by its capability to impart excellent water wettability to contact lens but also by the fact that it will not affect the optical characteristic and physical properties of lens, allowing the best use of the innate properties of lens material.

This combined with maintenance of oxygen permeability mentioned above makes it possible to increase the degree of freedom in selection of material and designing of contact lens and helps to eliminate the defects in the prior art.

The method of this invention is applied principally to the (meth)acryl type materials, fluoro(meth)acryl type materials and silicon-containing (meth)acryl type materials, but in view of the fact that most of the hard contact lenses commercially available at present are made of said materials, it is apparent that the present invention has a very wide scope of application.

Still further, the method for making contact lens hydrophilic according to this invention necessitates no complicate and large-scale treating apparatus, involves no difficulties in setting the treating conditions and can also provide good repeatability of the effect of the treatment.

These features were realized for the first time by the method of this invention and they are the effects peculiar to the present invention which could never be achieved with the prior art.

What is claimed is:

1. A method for making contact lens hydrophilic, which comprises contacting a contact lens with a treating solution containing a hydrophilic monomer, at least one photosensitizer selected from aromatic ketones or quinones, and a solvent, and thereafter irradiating said contact lens with ultraviolet light.

2. A method according to claim 1, wherein said hydrophilic monomer is a hydrophilic vinyl monomer.

3. A method according to claim 1, wherein said photosensitizer is selected from the group consisting of xanthone, thioxanthone, benzophenone, benzoin, benzyl, benzoyl peroxide, anthraquinone, phenanthraquinone, naphtoquinone and their derivatives.

4. A method according to claim 1, wherein said solvent is selected from the group consisting of alcohols, aliphatic or alicyclic hydrocarbons, and ketones.

5. A method according to claim 1, wherein the material of said contact lens is homopolymers or copolymers containing as their component at least one monomer selected from alkyl (meth)acrylate, aralkyl (meth)acrylate, cycloalkyl (meth)acrylate, alkylcycloalkyl (meth)acrylate, fluoro (meth)acrylate, and silicon-containing (meth)acrylates.

6. A contact lens with improved hydrophilicity obtained by a method according to claim 1.

* * * * *